(12) United States Patent
Nishikawa et al.

(10) Patent No.: US 10,009,895 B2
(45) Date of Patent: Jun. 26, 2018

(54) BEAMFORMING FOR SELECTING A TRANSMITTING DIRECTION BASED ON FEEDBACK FROM A RECEPTION DEVICE

(71) Applicant: FUJITSU LIMITED, Kawasaki-shi, Kanagawa (JP)

(72) Inventors: Kenichi Nishikawa, Kawasaki (JP); Kazuyuki Ozaki, Yokohama (JP); Masahiko Shimizu, Kawasaki (JP)

(73) Assignee: FUJITSU LLIMITED, Kawasaki (JP)

( * ) Notice: Subject to any disclaimer, the term of this patent is extended or adjusted under 35 U.S.C. 154(b) by 0 days. days.

(21) Appl. No.: 15/370,068

(22) Filed: Dec. 6, 2016

(65) Prior Publication Data

US 2017/0164368 A1  Jun. 8, 2017

(30) Foreign Application Priority Data

Dec. 8, 2015  (JP) ................. 2015-239114

(51) Int. Cl.
*H04W 72/04* (2009.01)
*H04B 7/06* (2006.01)
(Continued)

(52) U.S. Cl.
CPC ...... *H04W 72/0453* (2013.01); *H04B 7/0617* (2013.01); *H04B 17/318* (2015.01); *H04L 43/16* (2013.01)

(58) Field of Classification Search
CPC ............. H04W 72/0453; H04W 72/04; H04W 72/046; H04W 16/28; H04W 88/00;
(Continued)

(56) References Cited

U.S. PATENT DOCUMENTS 6,175,747 B1  1/2001  Tanishima et al.
6,377,213 B1  4/2002  Odachi et al.
(Continued)

FOREIGN PATENT DOCUMENTS

JP  10-23498  1/1998
JP  2000-196328  7/2000
(Continued)

*Primary Examiner* — Meless Zewdu
(74) *Attorney, Agent, or Firm* — Fujitsu Patent Center

(57) ABSTRACT

A transmission method executed by a transmission device, the transmission method including performing a plurality of transmitting processes in accordance with a plurality of transmitting patterns, each of the plurality of transmitting processes including transmitting a plurality of signals for a plurality of directions in parallel by forming a plurality of beams corresponding to the plurality of directions, each of the plurality of transmitting patterns being defined a combination of directions to be transmitted in parallel, receiving a result of a determining from a reception device, the determining including determining whether or not, for each of a plurality of receiving processes, the at least one signal satisfies a predetermined condition, each of the plurality of receiving processes including receiving at least one signal transmitted from the transmission device, and selecting a transmitting direction for the reception device from the plurality of directions based on a result of the determining.

7 Claims, 16 Drawing Sheets

(51) Int. Cl.
  *H04L 12/26* (2006.01)
  *H04B 17/318* (2015.01)
(58) Field of Classification Search
  CPC ... H04W 88/02; H04W 88/08; H04W 72/085; H04L 43/16; H04L 12/26; H04B 7/0617; H04B 17/318; H04B 7/06; H04B 7/0897; H04B 1/7113; H04B 1/7115; H04B 7/0478; H04B 7/061; H04B 7/0408; H04B 7/0404; H04B 7/0413; H04B 7/043; H04B 7/0613; H04B 7/0695; H01Q 15/0033
  See application file for complete search history.

(56) References Cited

U.S. PATENT DOCUMENTS

| | | | | |
|---|---|---|---|---|
| 7,072,692 | B1* | 7/2006 | Katz | H04B 7/0608 |
| | | | | 455/562.1 |
| 9,318,805 | B2* | 4/2016 | Jia | H01Q 3/34 |
| 2005/0280538 | A1 | 12/2005 | Kawai et al. | |
| 2006/0245512 | A1* | 11/2006 | Rha | H04B 7/0617 |
| | | | | 375/267 |
| 2007/0009016 | A1* | 1/2007 | Tsutsui | H04B 7/0413 |
| | | | | 375/219 |
| 2010/0255790 | A1* | 10/2010 | Farajidana | H04B 7/0695 |
| | | | | 455/69 |
| 2014/0185481 | A1* | 7/2014 | Seol | H04W 52/42 |
| | | | | 370/252 |
| 2014/0323144 | A1* | 10/2014 | Kim | H04B 7/0617 |
| | | | | 455/452.1 |
| 2016/0087336 | A1* | 3/2016 | Maltsev | H04B 7/0695 |
| | | | | 342/368 |
| 2016/0119910 | A1* | 4/2016 | Krzymien | H04B 7/0639 |
| | | | | 370/329 |
| 2016/0127919 | A1* | 5/2016 | Hui | H04W 16/28 |
| | | | | 342/371 |
| 2017/0012692 | A1* | 1/2017 | Kim | H04B 7/0695 |
| 2017/0104517 | A1* | 4/2017 | Kakishima | H04B 7/0456 |
| 2017/0134964 | A1* | 5/2017 | Yu | H04W 16/28 |

FOREIGN PATENT DOCUMENTS

| | | |
|---|---|---|
| JP | 2002-152108 | 5/2002 |
| JP | 2002-232341 | 8/2002 |
| JP | 2006-010345 | 1/2006 |

* cited by examiner

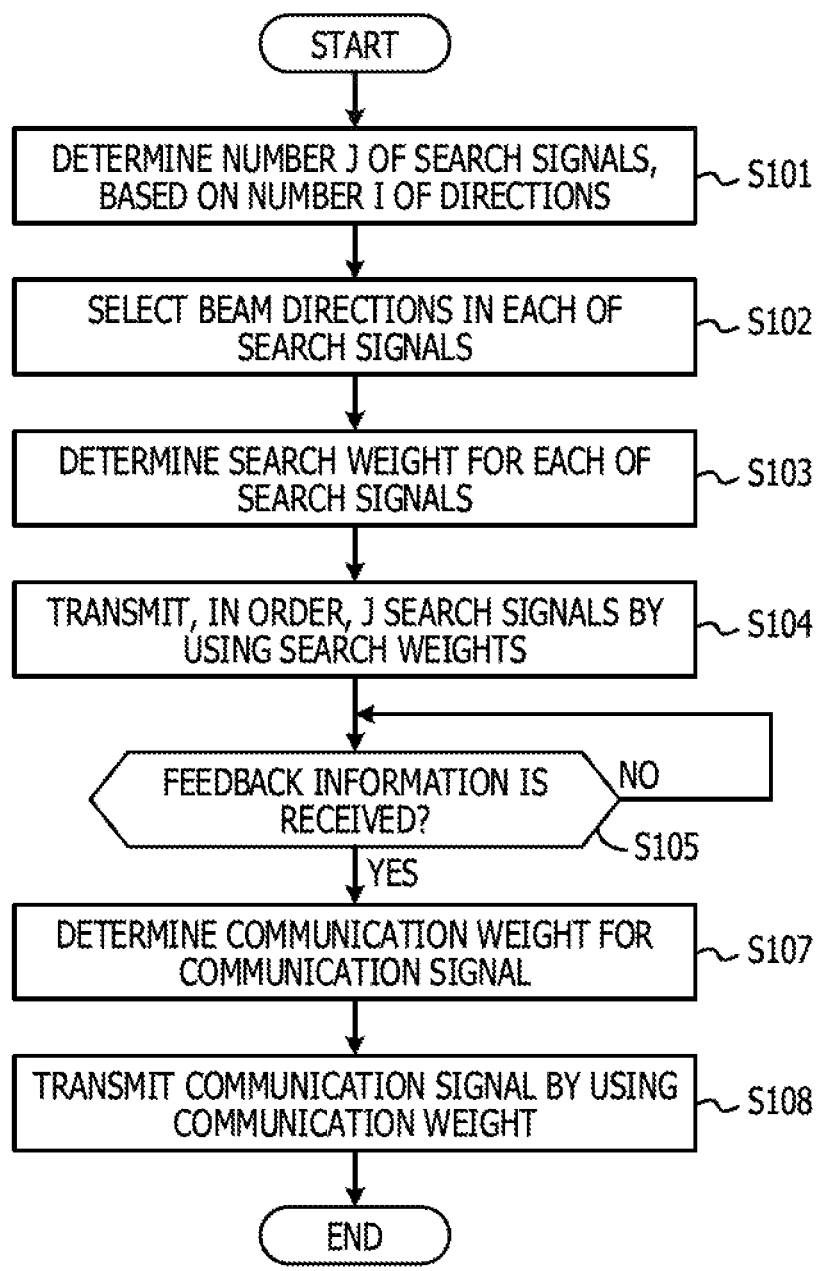

FIG. 14

|  | FIRST SEARCH SIGNAL | SECOND SEARCH SIGNAL | THIRD SEARCH SIGNAL |
|---|---|---|---|
| RECEPTION POWER LEVEL | -40dBm | -45 dBm | -60 dBm |
| THRESHOLD VALUE | -55 dBm | -55 dBm | -55 dBm |
| DETERMINATION RESULT | ○ | ○ | × |

FIG. 16

|  | FIRST SEARCH SIGNAL | SECOND SEARCH SIGNAL | THIRD SEARCH SIGNAL |
|---|---|---|---|
| BEAM DIRECTION GAIN | 15 dBi | 7 dBi | 20 dBi |
| GAIN DIFFERENCE | 7 dB | 5 dB | 16 dB |
| NON-BEAM DIRECTION GAIN | 8 dBi | 2 dBi | 4 dBi |
| RECEPTION POWER LEVEL | -40 dBm | -45 dBm | -60 dBm |
| VIRTUAL RECEPTION POWER LEVEL | -55 dBm | -52 dBm | -80 dBm |
| THRESHOLD VALUE | -44 dBm | -50 dBm | -48 dBm |
| DETERMINATION RESULT | ○ | ○ | × |

BEAMFORMING FOR SELECTING A TRANSMITTING DIRECTION BASED ON FEEDBACK FROM A RECEPTION DEVICE

CROSS-REFERENCE TO RELATED APPLICATION

This application is based upon and claims the benefit of priority of the prior Japanese Patent Application No. 2015-239114, filed on Dec. 8, 2015, the entire contents of which are incorporated herein by reference.

FIELD

The embodiments discussed herein are related to a wireless communication system, a transmission device, and a transmission method.

BACKGROUND

A wireless communication system including a transmission device to transmit a wireless signal by using a beam forming technology and a reception device to receive the transmitted wireless signal is known (see, for example, Japanese Laid-open Patent Publication No. 10-023498, Japanese Laid-open Patent Publication No. 2002-152108, and Japanese Laid-open Patent Publication No. 2000-196328). The transmission device transmits a signal in which a radiation power level in each of directions selected from among different directions is larger than a radiation power level in each of the other directions.

Within directions, the above-mentioned wireless communication system searches for a direction nearest to a direction from the transmission device to the reception device. A process for searching, within directions, for a direction nearest to a direction from the transmission device to the reception device is expressed as a beam search process, for example.

In the beam search process, the transmission device transmits search signals in which respective selected directions thereof are different. Furthermore, the reception device receives the search signals. In addition, based on reception results of the respective search signals in the reception device, the above-mentioned wireless communication system selects a direction nearest to a direction from the transmission device to the reception device, from among the directions.

SUMMARY

According to an aspect of the invention, an transmission method executed by a transmission device, the transmission method including performing a plurality of transmitting processes in accordance with a plurality of transmitting patterns, each of the plurality of transmitting processes including transmitting a plurality of signals for a plurality of directions in parallel by forming a plurality of beams corresponding to the plurality of directions, each of the plurality of transmitting patterns being defined a combination of directions to be transmitted in parallel, receiving a result of a determining from a reception device, the determining including determining whether or not, for each of a plurality of receiving processes, the at least one signal satisfies a predetermined condition, each of the plurality of receiving processes including receiving at least one signal transmitted from the transmission device, and selecting a transmitting direction for the reception device from the plurality of directions based on a result of the determining.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a flowchart illustrating an example of processing performed by a transmission device of a first example of a modification to the first embodiment;

FIG. 14 is a table illustrating an example of a relationship between a reception power level, a threshold value, and a determination result in the wireless communication system of the first example of a modification to the second embodiment;

FIG. 16 is a table illustrating an example of a relationship between a reception power level, a virtual reception power level, and a threshold value in the wireless communication system of the second example of a modification to the second embodiment.

DESCRIPTION OF EMBODIMENTS

Figure 1:
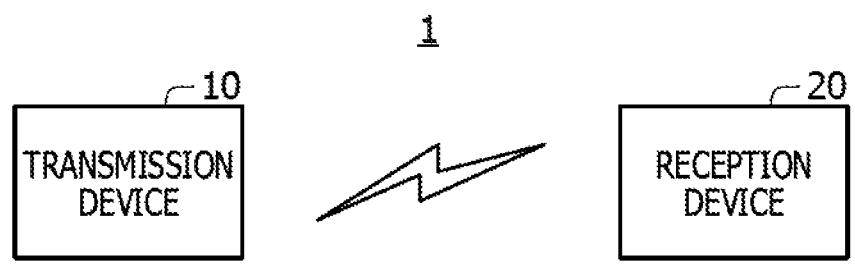
FIG. 1 is a block diagram illustrating an example of a configuration of a wireless communication system of a first embodiment.

In the beam search process, a first wireless communication system uses, as search signals, signals for each of which only 1 direction is selected from among, for example, 8 directions. In the beam search process, the first wireless communication system transmits the search signals in which the number thereof is equal to the number of the directions. In addition, based on reception results of the 8 search signals, the first wireless communication system selects, from among the relevant 8 directions, a direction nearest to a direction from a transmission device to a reception device.

In the beam search process, a second wireless communication system uses, as a first search signal, a signal for which 4 directions are selected from among, for example, 8 directions. In a case where, based on a reception result of the first search signal, it is determined that the relevant 4 directions include a direction nearest to a direction from a transmission device to a reception device, the second wireless communication system uses, as a second search signal, a signal for which 2 directions are selected from among the relevant 4 directions.

In a case where, based on a reception result of the second search signal, it is determined that the relevant 2 directions include a direction nearest to the direction from the transmission device to the reception device, the second wireless communication system uses, as a third search signal, a signal for which 1 direction is selected from among the relevant 2 directions. In addition, based on a reception result of the third search signal, the second wireless communication system selects, from among the relevant 8 directions, a direction nearest to the direction from the transmission device to the reception device.

In this way, based on the reception results of the 3 search signals, the second wireless communication system selects, from among the relevant 8 directions, a direction nearest to the direction from the transmission device to the reception device.

By the way, in a case of including reception devices, the second wireless communication system separately executes the beam search process for each of the reception devices. Accordingly, the number of search signals transmitted in the beam search processes increases with an increase in the number of the reception devices.

In this way, in each of the first wireless communication system and the second wireless communication system, the number of search signals transmitted in the beam search process tends to increase. Therefore, it is difficult to swiftly select, from among directions, a direction nearest to a direction from a transmission device to a reception device, in some cases.

In one aspect, an object is to swiftly select, from among directions, a direction nearest to a direction from a transmission device to a reception device.

Hereinafter, embodiments of the present technology will be described with reference to drawings. In this regard, however, the embodiments to be described hereinafter are exemplifications. Accordingly, applications of various modifications or technologies, not clearly specified, to the embodiments are not excluded. Note that, in drawings used for the following embodiments, a portion to which the same symbol is assigned indicates the same portion or a similar portion as long as no alternation and no modification is clearly specified.

First Embodiment

Configuration

As illustrated in, for example, FIG. 1, a wireless communication system 1 of a first embodiment includes a transmission device 10 and a reception device 20.

In the present example, the, wireless communication system 1 performs wireless communication in accordance with a communication method specified by 3GPP. The 3GPP is an abbreviation of Third Generation Partnership Project.

The communication method may be a communication method called, for example, LTE, LTE-Advanced, or 5G. The LTE is an abbreviation of Long Term Evolution. The 5G is an abbreviation of 5th Generation Mobile Network or 5th Generation Wireless System.

Note that the wireless communication system 1 may perform wireless communication by using a millimeter wave or a microwave. The millimeter wave is an electromagnetic wave having a wavelength of, for example, 1 mm to 10 mm. The millimeter wave is an electromagnetic wave having a frequency of, for example, 30 GHz to 300 GHz. The microwave is an electromagnetic wave having a wavelength of, for example, 100 μm to 1 m. The microwave is an electromagnetic wave having a frequency of, for example, 300 MHz to 3 THz. The wireless communication system 1 may be compliant with, for example, a standard specified by IEEE 802.11ad or a standard based on the relevant standard. The IEEE is an abbreviation of Institute of Electrical and Electronics Engineers.

Note that the number of the transmission devices 10 included in the wireless communication system 1 may be 2 or more. In addition, the number of the reception devices 20 included in the wireless communication system 1 may be 2 or more. In the present example, the transmission device 10 is a base station, and the reception device 20 is a mobile station. Note that the transmission device 10 may be a mobile station and the reception device 20 may be a base station.

The base station may be expressed as an evolved node B (eNB) or a node B (NB). In addition, the mobile station may be expressed as a wireless terminal, wireless equipment, a wireless device, or a user terminal (user equipment: UE).

Figure 2:
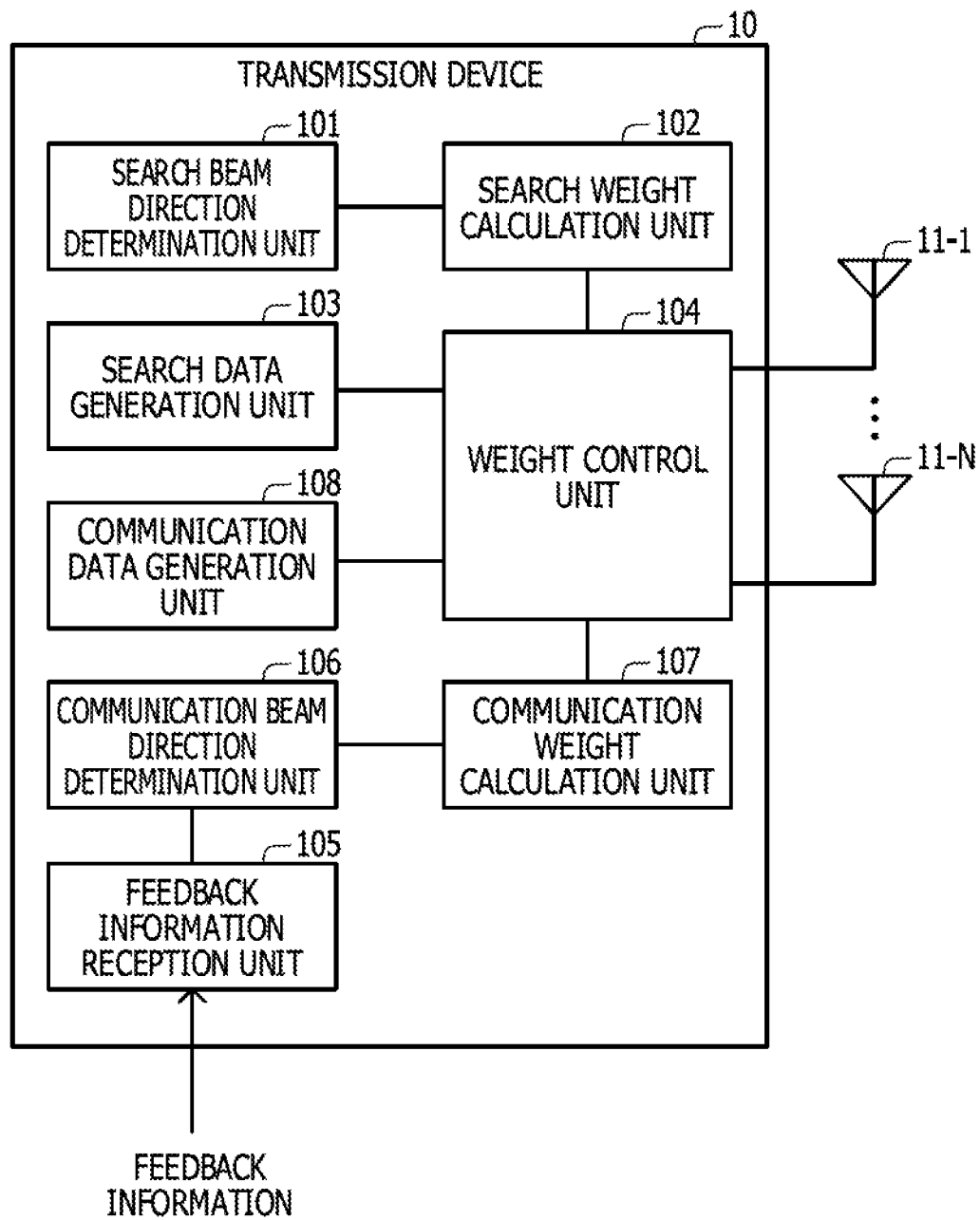
FIG. 2 is a block diagram illustrating an example of a configuration of a transmission device in FIG. 1.

As illustrated in, for example, FIG. 2, the transmission device 10 includes N antennas 11-1, . . . , and 11-N, a search beam direction determination unit 101, a search weight calculation unit 102, a search data generation unit 103, and a weight control unit 104. Furthermore, the transmission device 10 includes a feedback information reception unit 105, a communication beam direction determination unit 106, a communication weight calculation unit 107, and a communication data generation unit 108. N indicates an integer greater than or equal to "2".

The search beam direction determination unit 101, the search weight calculation unit 102, and the weight control unit 104 correspond to an example of a transmission unit. The feedback information reception unit 105 and the communication beam direction determination unit 106 correspond to an example of a selection unit.

In the present example, individual elements other than the antennas 11-1, . . . , and 11-N, included in the transmission device 10, are realized by a Large Scale Integration (LSI). Note that at least some of individual elements of the transmission device 10 may be realized by a programmable logic circuit device (for example, a PLD or an FPGA). The PLD is an abbreviation of a programmable logic device. The FPGA is an abbreviation of a field-programmable gate array.

In addition, the transmission device 10 may include a processing device and a memory device, and a program memorized (stored) in the memory device may be executed by the processing device, thereby realizing at least some of the individual elements of the transmission device 10. The processing device is, for example, a CPU or a DSP. The CPU is an abbreviation of a central processing unit. The DSP is an abbreviation of a digital signal processor.

The memory device includes at least one of, for example, a random access memory, a read only memory, a hard disk drive, a solid state drive, a semiconductor memory, and an organic memory.

In the present example, the N antennas 11-1, ..., and 11-N form an array antenna.

The transmission device 10 transmits a signal having beams in respective directions selected from among different directions in which the number of directions is "I". In other words, the transmission device 10 transmits a wireless signal by using the beam forming technology.

It may be considered that the signal having beams in the respective directions selected from among the different directions in which the number of directions is "I" is a signal in which radiation power levels in the respective directions selected from among the different directions having the number I of directions are larger than a radiation power level in each of the other directions (in other words, directions not selected from among the different directions having the number I of directions).

Each of the selected directions may be expressed as a beam direction. In addition, each of the directions not selected may be expressed as a non-beam direction. In addition, each of the directions may be considered as an area. "I" indicates an integer greater than or equal to "2". In the present example, the number I of directions is preliminarily set. Note that the number I of directions may be changed. A selection of directions may be expressed as a decision of directions.

Within the different directions in which the number of directions is "I", the transmission device 10 searches for a direction nearest to a direction from the transmission device 10 to the reception device 20. A process for searching, within the different directions in which the number of directions is "I", for a direction nearest to the direction from the transmission device 10 to the reception device 20 may be expressed as the beam search process.

Based on the number I of directions, the search beam direction determination unit 101 determines the number J of search signals. The number J of search signals indicates the number of search signals transmitted in the beam search process. In the present example, the search beam direction determination unit 101 determines, as the number J of search signals, a minimum value out of integers L satisfying Mathematical Expression 1.

$$2^L > I$$

In a case where the number I of directions is, for example, "2" or "3", the search beam direction determination unit 101 determines "2" as the number J of search signals. In addition, in a case where the number I of directions is, for example, one of "4" to "7", the search beam direction determination unit 101 determines "3" as the number J of search signals. In addition, in a case where the number I of directions is, for example, one of "8" to "15", the search beam direction determination unit 101 determines "4" as the number J of search signals.

By using, as the number J of search signals, the minimum value out of the integers L satisfying Mathematical Expression 1, it is possible to decrease the number J of search signals. Accordingly, it is possible to swiftly select a direction nearest to the direction from the transmission device 10 to the reception device 20, from among the different directions in which the number of directions is "I". Note that the search beam direction determination unit 101 may determine, as the number J of search signals, a value larger than the minimum value out of the integers L satisfying Mathematical Expression 1.

Based on the determined number J of search signals, the search beam direction determination unit 101 selects beam directions for each of the search signals so that the presences or absences of beams for the individual search signals vary depending on individual directions. Note that it may be considered that the presences or absences of beams for the individual search signals correspond to a combination of whether or not directions are selected as beam directions in the individual search signals, with respect to the search signals in which the number of search signals is "J".

Accordingly, a combination of search signals having, with respect to each of directions having the number I of directions, beams in the relevant direction is different from a combination of search signals each having a beam in any one of directions different from the relevant direction. In other words, a combination of search signals for which, with respect to each of directions having the number I of directions, the relevant direction is selected is different from a combination of search signals for which any one of directions different from the relevant direction is selected.

Figure 3A:
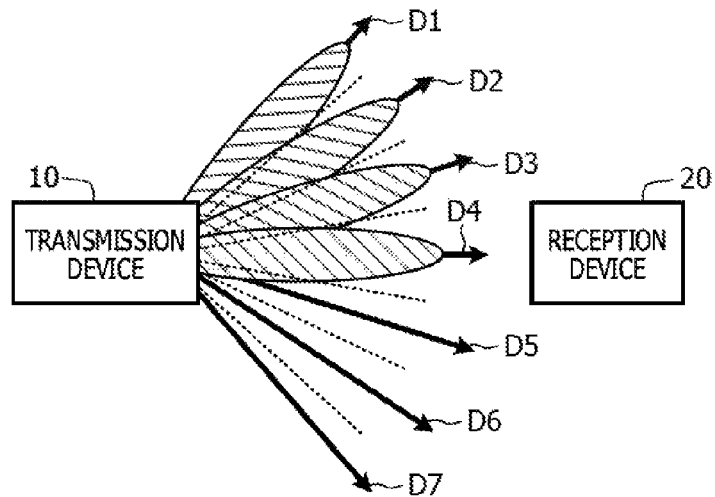
FIGS. 3A to 3C are explanatory diagrams each illustrating an example of a search signal transmitted by the transmission device in FIG. 1.
Figure 3B:
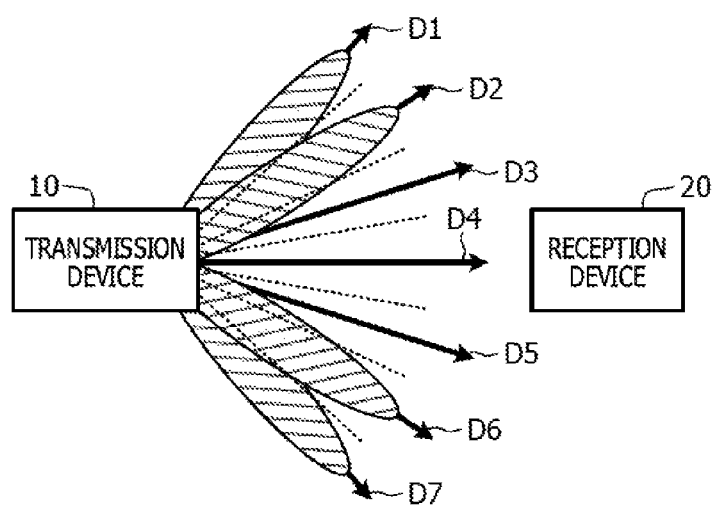
Figure 3C:
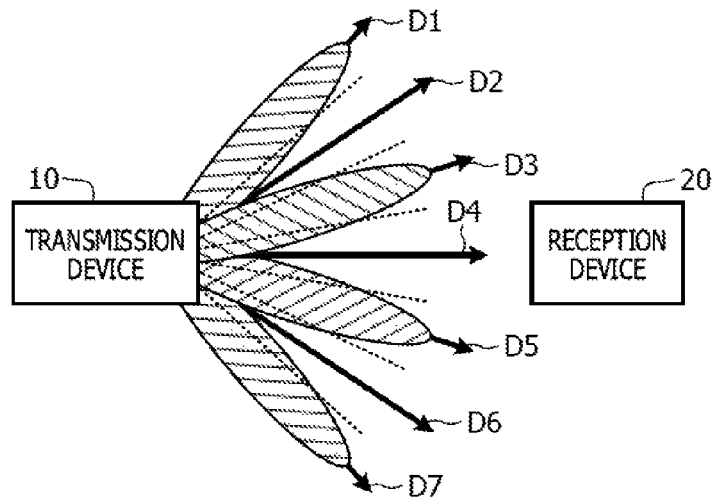

As illustrated in, for example, FIGS. 3A to 3C, in a case where the number I of directions is "7", the search beam direction determination unit 101 determines "3" as the number J of search signals. Furthermore, as illustrated in FIG. 3A, the search beam direction determination unit 101 selects first to fourth directions D1 to D4, in the first search signal. In addition, as illustrated in FIG. 3B, the search beam direction determination unit 101 selects the first and second directions D1 and D2 and sixth and seventh directions D6 and D7, in a second search signal. Furthermore, as illustrated in FIG. 3C, the search beam direction determination unit 101 selects the first and third directions D1 and D3 and fifth and seventh directions D5 and D7, in a third search signal.

Accordingly, in this case, for each of directions having the number I of directions, a combination of search signals for which the relevant direction is selected is as follows.

the first direction D1: the first, second, and third search signals
the second direction D2: the first and second search signals
the third direction D3: the first and third search signals
the fourth direction D4: the first search signal
the fifth direction D5: the third search signal
the sixth direction D6: the second search signal
the seventh direction D7: the second and third search signals In this way, a combination of search signals for which, with respect to each of directions having the number I of directions, the relevant direction is selected is different from a combination of search signals for which any one of directions different from the relevant direction is selected.

The selection of beam directions for each of the search signals is performed as follows, for example.

The search beam direction determination unit 101 determines the number of selections for each of the directions having the number I of directions. The determined number of selections is one of "1" to "J". The number of directions for each of which the number j of selections is determined is less than or equal to the number $_IC_j$ of combinations in which j are selected from among J. "j" indicates one of integers of "1" to "J". Furthermore, for each of the directions having the number I of directions, the search beam direction determination unit 101 selects search signals corresponding to the determined number of selections, from among the search signals having the number J of search signals. Combinations of search signals selected for directions each having the identical determined number of selections are different from one another. In each of search signals selected for each of directions, the search beam direction determination unit 101 selects the relevant direction as a beam direction.

Note that the selection of beam directions for each of the search signals may be performed as follows.

The search beam direction determination unit 101 assigns, to each of the directions having the number I of directions, one of integers of "1" to "I" and selects, based on the assigned integers, beam directions of each of the search signals. The search beam direction determination unit 101 converts the corresponding one of the assigned integers into, for example, a string of J numeric characters in accordance with binary digits, and in a case where a j-th numeric character is a predetermined value (for example, "1"), the search beam direction determination unit 101 selects, as a beam direction in the j-th search signal, a direction to which the relevant integer is assigned.

As illustrated in FIG. 2, for each of the search signals, the search weight calculation unit 102 calculates a search weight, based on beam directions selected by the search beam direction determination unit 101, and outputs the calculated search weight to the weight control unit 104. The calculation of a weight is an example of determination of the weight.

In the present example, the search weight calculation unit 102 calculates the search weight in accordance with a DCMP method. The DCMP is an abbreviation of directionally constrained minimization of power. The DCMP method is a method described in, for example, Kikuma, Nobuyoshi, *Adaptive Signal Processing Based on Array Antenna*, kagaku gijutsu shuppan, inc., page 87 to page 92, 2004.

The search data generation unit 103 generates search data. In the present example, the search data includes an error detection code. The error detection code may be, for example, a CRC value. The CRC is an abbreviation of cyclic redundancy check. The search data generation unit 103 outputs the generated search data to the weight control unit 104.

The weight control unit 104 converts, into a wireless signal, the search data input by the search data generation unit 103. By multiplying the converted wireless signal by the search weight input by the search weight calculation unit 102, the weight control unit 104 generates N search signal sequences while associating the N search signal sequences with the respective N antennas 11-1, . . . , and 11-N.

The weight control unit 104 outputs the generated N search signal sequences to the respective N antennas 11-1, . . . , and 11-N associated therewith so that the search signals having the number J of search signals are transmitted in order.

The N antennas 11-1, . . . , and 11-N transmit the respective N search signal sequences output by the weight control unit 104. This causes the transmission device 10 to transmit, in order, the search signals having the number J of search signals.

Figure 4:
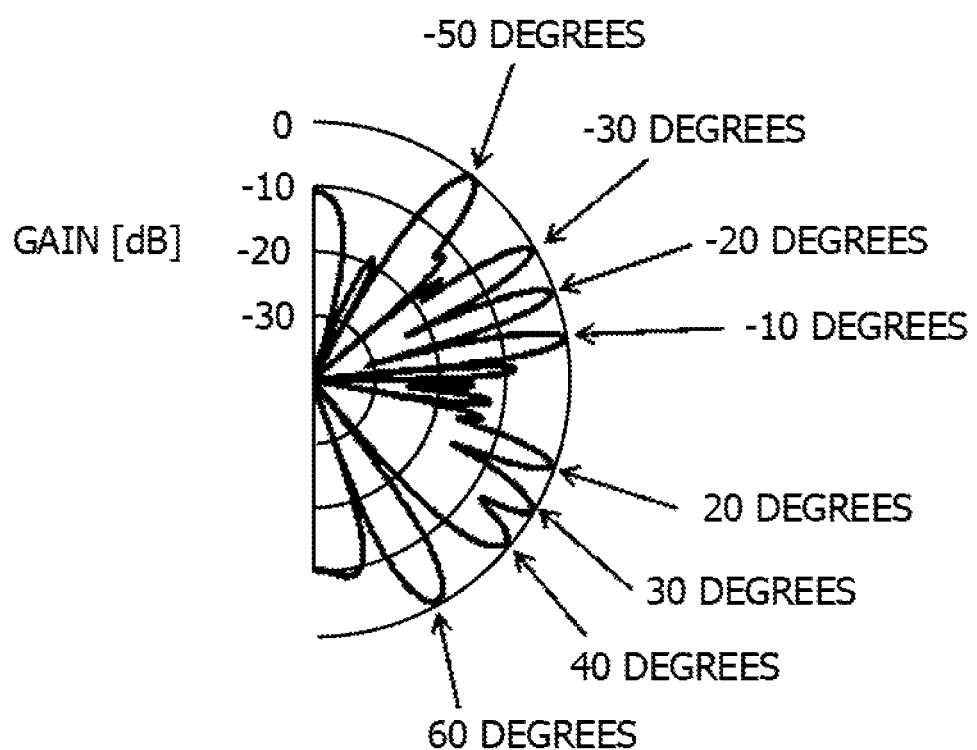
FIG. 4 is an explanatory diagram illustrating an example of a change in a gain of a signal transmitted by the transmission device in FIG. 1, with respect to directions.

As illustrated in, for example, FIG. 4, the wireless signal transmitted by the N antennas 11-1, . . . , and 11-N has a radiation power level varying depending on directions. A gain in FIG. 4 indicates a ratio of a radiation power level to a predetermined reference value.

As illustrated in FIG. 2, the feedback information reception unit 105 receives feedback information from the reception device 20. In the present example, the feedback information indicates a result of determination of whether or not each of the search signals satisfies a reception condition. The reception condition will be described later. The feedback information reception unit 105 outputs the received feedback information to the communication beam direction determination unit 106.

Based on the feedback information input by the feedback information reception unit 105, the communication beam direction determination unit 106 selects a beam direction in a communication signal. In the present example, the communication beam direction determination unit 106 selects, as a beam direction in the communication signal, a direction selected by the search beam direction determination unit 101 for a combination of search signals each determined as satisfying the reception condition in the feedback information. This causes the communication beam direction determination unit 106 to select, as a beam direction in the communication signal, a direction that is nearest to a direction from the transmission device 10 to the reception device 20 and that is included in the directions having the number I of directions.

Based on the beam direction selected by the communication beam direction determination unit 106, the communication weight calculation unit 107 calculates a communication weight and outputs the calculated communication weight to the weight control unit 104.

The communication data generation unit 108 generates communication data. The communication data may be expressed as user data. The communication data generation unit 108 outputs the generated communication data to the weight control unit 104.

The weight control unit 104 converts, into a wireless signal, the communication data input by the communication data generation unit 108. By multiplying the converted wireless signal by the communication weight input by the communication weight calculation unit 107, the weight control unit 104 generates N communication signal sequences while associating the N communication signal sequences with the respective N antennas 11-1, . . . , and 11-N.

The weight control unit 104 outputs the generated N communication signal sequences to the respective N antennas 11-1, . . . , and 11-N associated therewith.

The N antennas 11-1, . . . , and 11-N transmit the respective N communication signal sequences output by the weight control unit 104.

Figure 5:
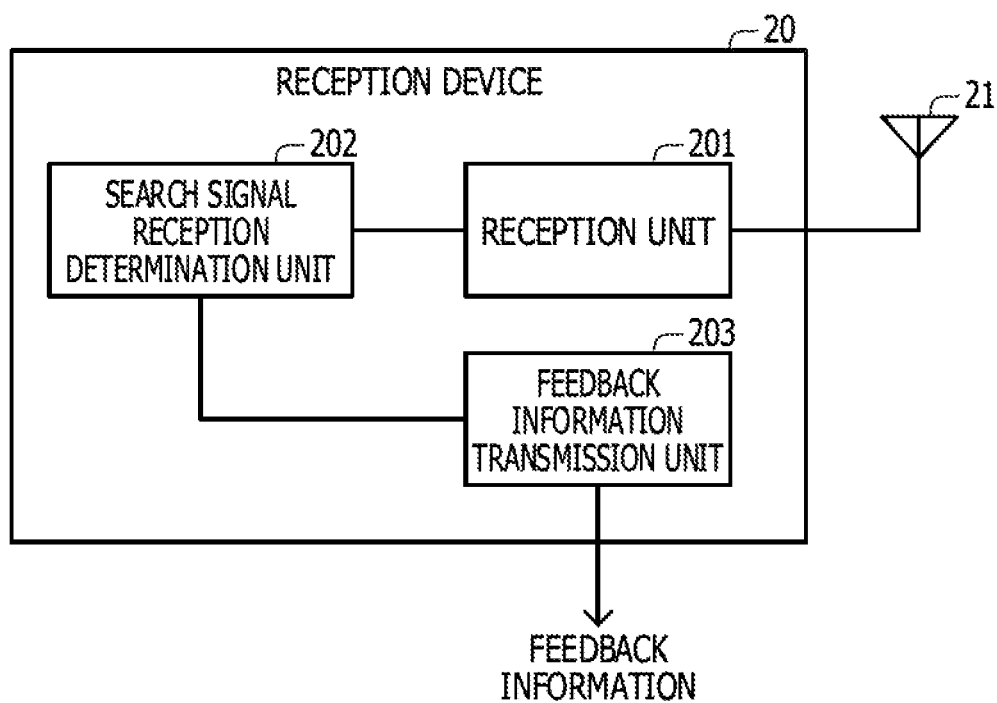
FIG. 5 is a block diagram illustrating an example of a configuration of a reception device in FIG. 1.

As illustrated in, for example, FIG. 5, the reception device 20 includes an antenna 21, a reception unit 201, a search signal reception determination unit 202, and a feedback information transmission unit 203. Note that the number of the antennas 21 included in the reception device 20 may be 2 or more.

In the present example, individual elements other than the antenna 21, included in the reception device 20, are realized by an LSI. Note that at least some of individual elements of the reception device 20 may be realized by a programmable logic circuit device (for example, a PLD or an FPGA). In addition, the reception device 20 may include a processing device and a memory device, and a program memorized (stored) in the memory device may be executed by the processing device, thereby realizing at least some of the individual elements of the reception device 20.

The reception unit 201 receives the search signals transmitted by the transmission device 10. In addition, the reception unit 201 receives the communication signal transmitted by the transmission device 10.

The search signal reception determination unit 202 determines whether or not each of the search signals received by the reception unit 201 satisfies the reception condition. In the present example, the reception condition is a condition that no error is detected by the error detection code included in the search signals.

The feedback information transmission unit 203 generates the feedback information indicating a result of determination performed by the search signal reception determination unit 202 and transmits the generated feedback information to the transmission device 10. In the present example, the feedback information indicates a result of determination performed on each of the search signals having the number J of search signals. In the present example, a result of the determination is "0" or "1". In the present example, that a result of the determination is "0" indicates that the corresponding one of the search signals does not satisfy the reception condition, and that a result of the determination is "1" indicates that the corresponding one of the search signals satisfies the reception condition.

Note that the search signal reception determination unit 202 may perform soft decision as determination of whether or not each of the search signals satisfies the reception condition. In this case, a result of the determination may be a parameter indicating a likelihood.

In the present example, the feedback information transmission unit 203 transmits the feedback information to the transmission device 10 by using wireless communication. Note that the feedback information transmission unit 203 may transmit the feedback information to the transmission device 10 in accordance with a communication method different from a communication method used for receiving the search signals.

In addition, the feedback information may be transmitted along with an acknowledgement (ACK) signal for the search signals.

Operation

An operation of the wireless communication system 1 will be described.

Figure 6:
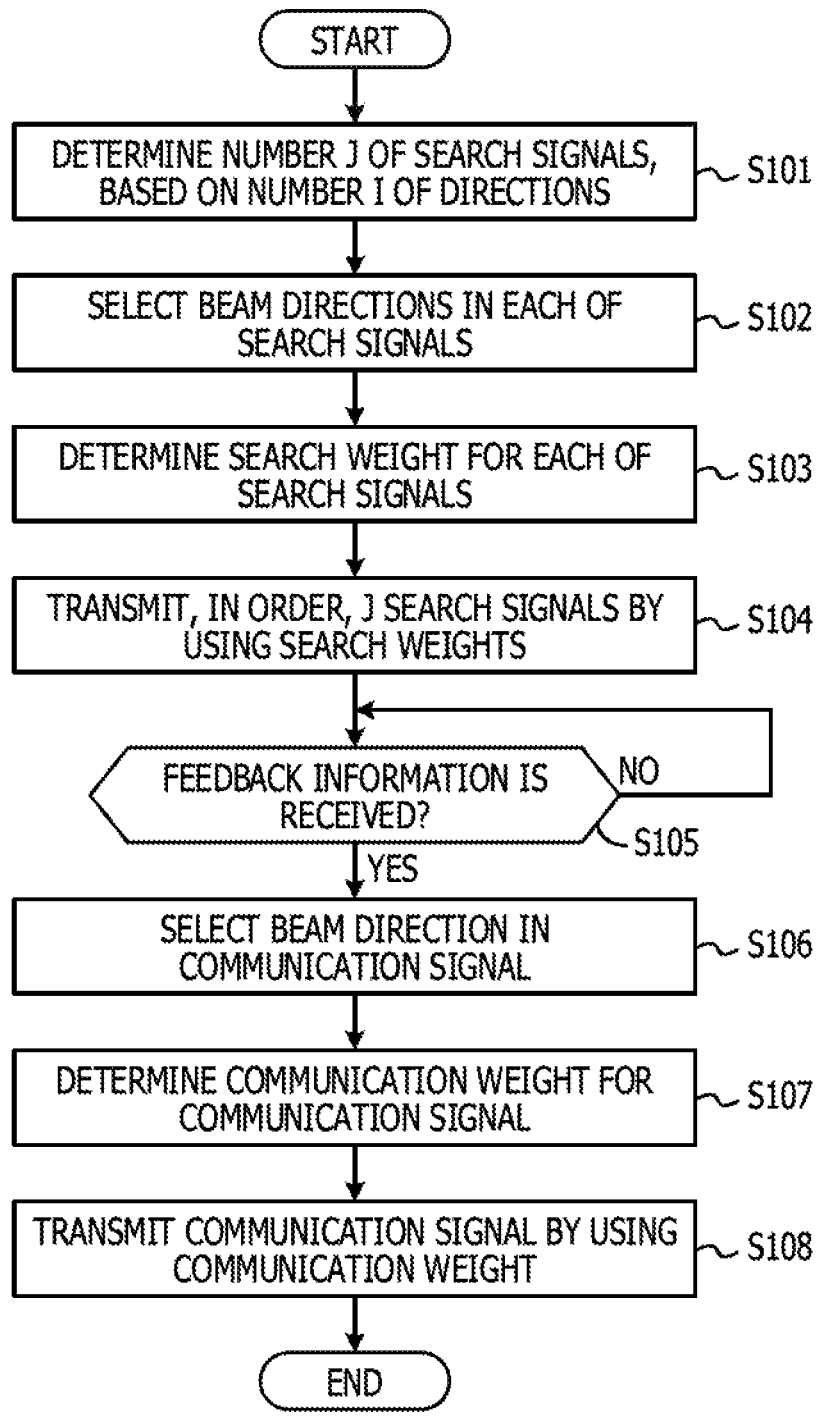
FIG. 6 is a flowchart illustrating an example of processing performed by the transmission device in FIG. 1.
Figure 7:
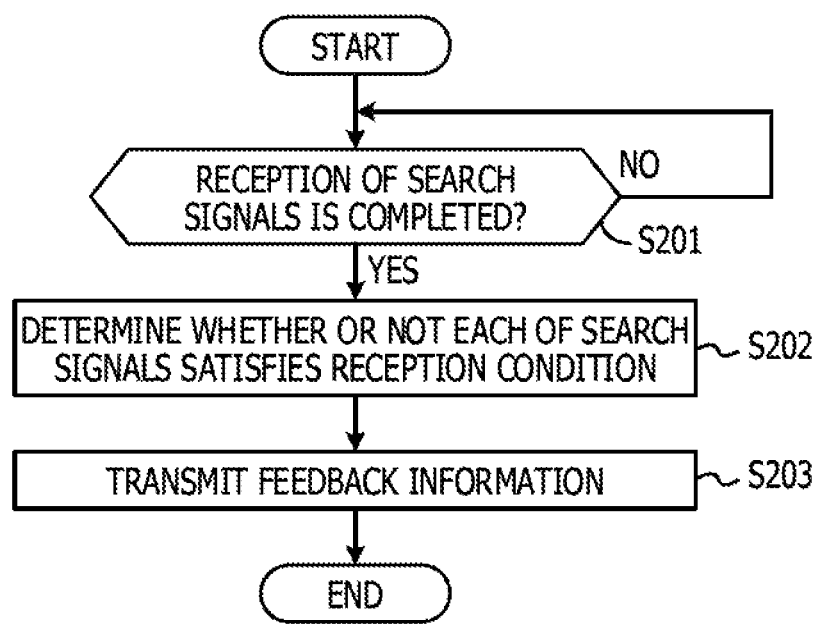
FIG. 7 is a flowchart illustrating an example of processing performed by the reception device in FIG. 1.

The transmission device 10 performs processing illustrated in, for example, FIG. 6, and the reception device 20 performs processing illustrated in, for example, FIG. 7. Hereinafter, the processing in FIG. 6 and the processing in FIG. 7 will be further described.

First, the transmission device 10 determines the number J of search signals, based on the number I of directions (step S101 in FIG. 6). Next, based on the number J of search signals, determined in step S101, the transmission device 10 selects beam directions in each of the search signals (step S102 in FIG. 6).

In addition, based on the beam directions selected in step S102, the transmission device 10 determines a search weight for each of the search signals (step S103 in FIG. 6). Next, by using the search weights determined in step S103, the transmission device 10 transmits, in order, the search signals having the number J of search signals (step S104 in FIG. 6).

In addition, the transmission device 10 waits until receiving the feedback information from the reception device 20 ("No" route in step S105 in FIG. 6).

On the other hand, the reception device 20 waits until reception of the search signals from the transmission device 10 is completed (in other words, all the search signals transmitted by the transmission device 10 are received) ("No" route in step S201 in FIG. 7).

In addition, in a case where the reception of the search signals from the transmission device 10 is completed, the reception device 20 determines as "Yes" and determines whether or not each of the received search signals satisfies the reception condition (step S202 in FIG. 7).

Next, the reception device 20 generates the feedback information indicating a result of the determination in step S202 and transmits the generated feedback information to the transmission device 10 (step S203 in FIG. 7). Then, the reception device 20 terminates the processing in FIG. 7.

This causes the transmission device 10 to receive the feedback information from the reception device 20. Accordingly, the transmission device 10 determines as "Yes" in step S105 in FIG. 6 and selects a beam direction in the communication signal, based on the received feedback information (step S106 in FIG. 6).

In addition, based on the beam direction selected in step S106, the transmission device 10 determines a communication weight for the communication signal (step S107 in FIG. 6). Next, by using the communication weight determined in step S107, the transmission device 10 transmits the communication signal (step S108 in FIG. 6). This causes the reception device 20 to receive the communication signal from the transmission device 10. Then, the transmission device 10 terminates the processing in FIG. 6.

As described above, the transmission device 10 of the first embodiment transmits signals (the search signals in the present example) in each of which a radiation power level in each of directions selected from among different directions is larger than a radiation power level in each of the other directions. Here, a combination of whether or not being selected in the individual signals, with respect to the signals, varies depending on the individual directions. Furthermore, the reception device 20 receives each of the signals and determines whether or not each of the received signals satisfies a predetermined condition (the reception condition in the present example). In addition, based on a result of the determination, the wireless communication system 1 selects, from among the directions, a direction nearest to a direction from the transmission device 10 to the reception device 20.

According to this, it is possible to decrease the number of signals (the search signals in the present example) to be transmitted in order to select, from among the directions, a direction nearest to the direction from the transmission device 10 to the reception device 20. Accordingly, it is possible to swiftly select, from among the directions, a direction nearest to the direction from the transmission device 10 to the reception device 20.

In the wireless communication system 1 of the first embodiment, the number of signals to be transmitted in the beam search process is, for example, $\log_2(I)$. Note that in a case where the number of the reception device 20 is greater than or equal to "2", the number of signals to be transmitted in the beam search process is $\log_2(I)$ in the wireless communication system 1 of the first embodiment.

On the other hand, in the above-mentioned first wireless communication system, the number of signals to be transmitted in the beam search process is, for example, "I". In addition, in the above-mentioned second wireless communication system, the number of signals to be transmitted in the beam search process is, for example, $K \cdot \log_2(I)$. "K" indicates the number of reception devices. Therefore, according to the wireless communication system 1 of the first embodiment, it is possible to decrease the number of signals to be transmitted in the beam search process, compared with the first and second wireless communication systems.

Furthermore, in the wireless communication system 1 of the first embodiment, the condition (the reception condition in the present example) is a condition that no error is detected by an error detection code included in the received signals (the search signals in the present example).

In a case where the direction from the transmission device 10 to the reception device 20 is not included in directions that are not selected and that are included in the directions, received signals each tend to include an error. Therefore, according to the wireless communication system 1, it is possible to improve a correlation between results of determination for the received signals and a direction that is nearest to the direction from the transmission device 10 to the reception device 20 and that is included in the directions. As a result, it is possible to select, from among the directions, a direction nearest to the direction from the transmission device 10 to the reception device 20 with a high degree of accuracy.

Note that the transmission device 10 and the reception device 20 may each include both the function of the transmission device 10 and the function of the reception device 20.

An example of selection of beam directions for each of the search signals in a case where the number I of directions is "5" will be further described. In this case, the search beam direction determination unit 101 determines "3" as the number J of search signals.

Figure 8A:
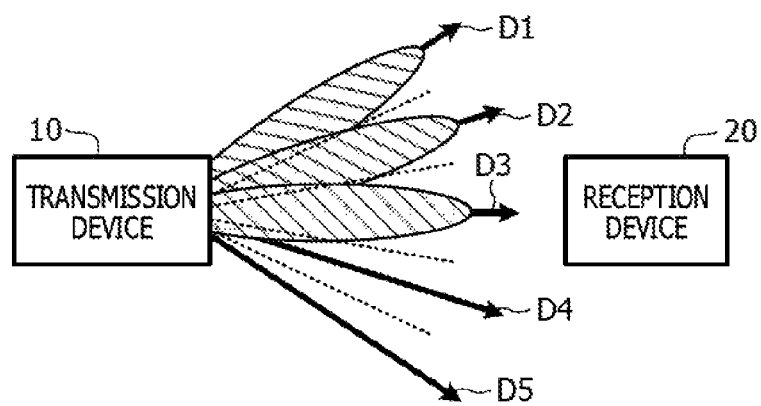
FIGS. 8A to 8C are explanatory diagrams each illustrating an example of a search signal transmitted by the transmission device in FIG. 1.
Figure 8B:
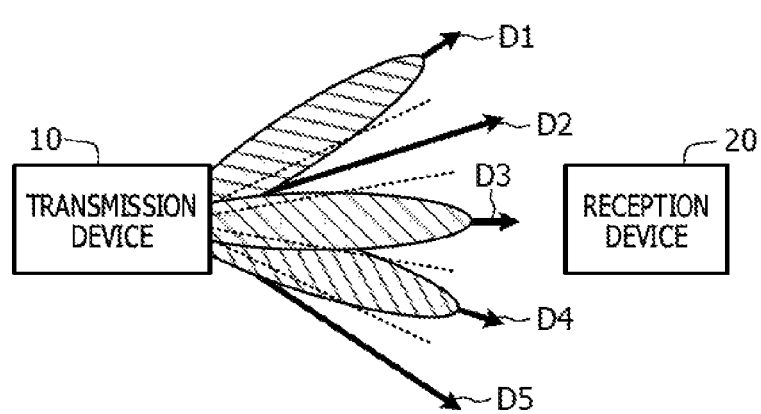
Figure 8C:
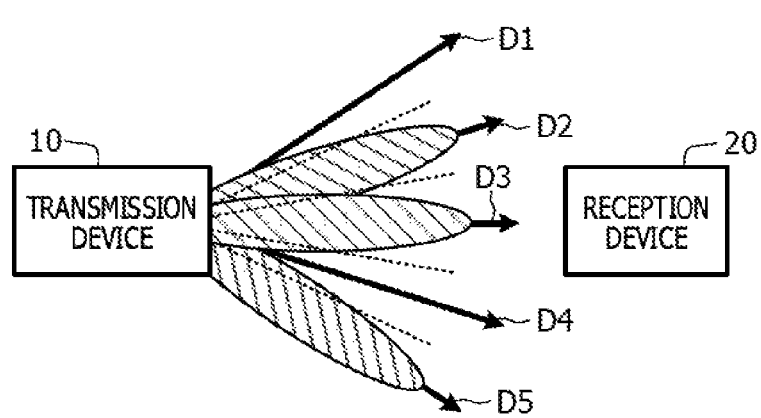

As illustrated in, for example, FIGS. 8A to 8C, the search beam direction determination unit 101 selects the first to third directions D1 to D3 in the first search signal. In addition, the search beam direction determination unit 101 selects the first, third, and fourth directions D1, D3, and D4 in the second search signal. Furthermore, the search beam direction determination unit 101 selects the second, third, and fifth directions D2, D3, and D5 in the third search signal.

Accordingly, in this case, for each of directions having the number I of directions, a combination of search signals for which the relevant direction is selected is as follows.
the first direction D1: the first and second search signals
the second direction D2: the first and third search signals
the third direction D3: the first, second, and third search signals
the fourth direction D4: the second search signal
the fifth direction D5: the third search signal In this way, a combination of search signals for which, with respect to each of directions having the number I of directions, the relevant direction is selected is different from a combination of search signals for which any one of directions different from the relevant direction is selected.

Figure 9A:
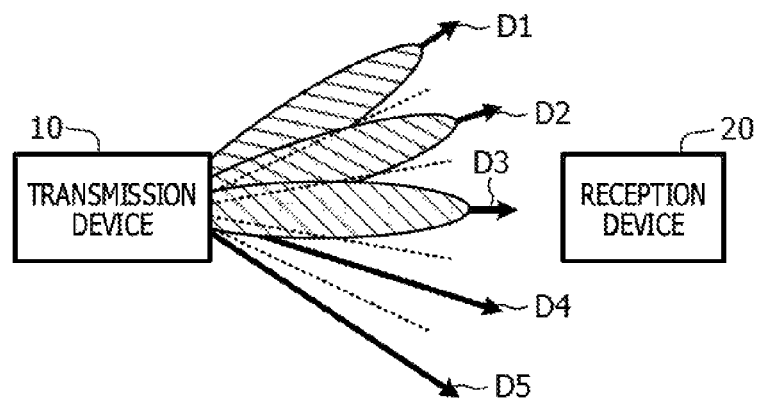
FIGS. 9A to 9C are explanatory diagrams each illustrating an example of a search signal transmitted by the transmission device in FIG. 1.
Figure 9B:
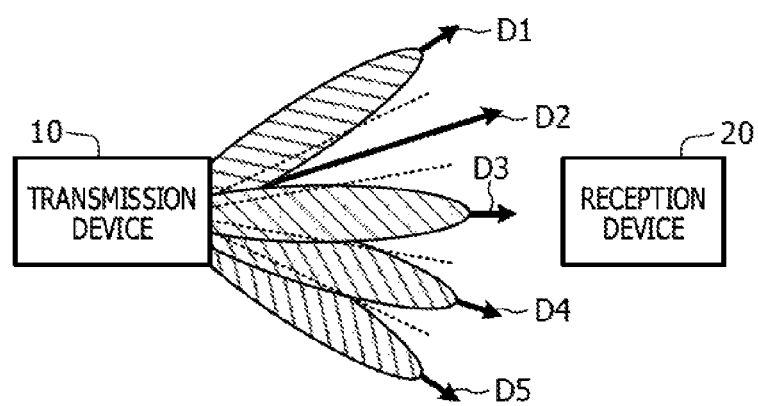
Figure 9C:
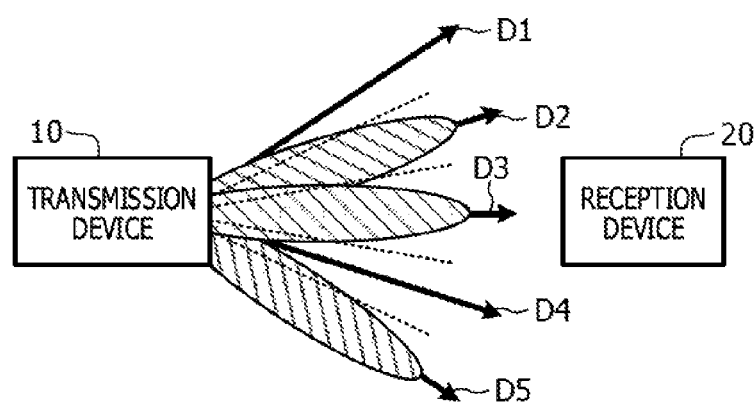

In addition, as illustrated in, for example, FIGS. 9A to 9C, the search beam direction determination unit 101 selects the first to third directions D1 to D3, in the first search signal. In addition, the search beam direction determination unit 101 selects the first, third, fourth, and fifth directions D1 and D3 to D5, in the second search signal. Furthermore, the search beam direction determination unit 101 selects the second, third, and fifth direction D2, D3, and D5, in the third search signal.

Accordingly, in this case, for each of directions having the number I of directions, a combination of search signals for which the relevant direction is selected is as follows.
the first direction D1: the first and second search signals
the second direction D2: the first and third search signals
the third direction D3: the first, second, and third search signals
the fourth direction D4: the second search signal
the fifth direction D5: the second and third search signals In this way, a combination of search signals for which, with respect to each of directions having the number I of directions, the relevant direction is selected is different from a combination of search signals for which any one of directions different from the relevant direction is selected.

Figure 10A:
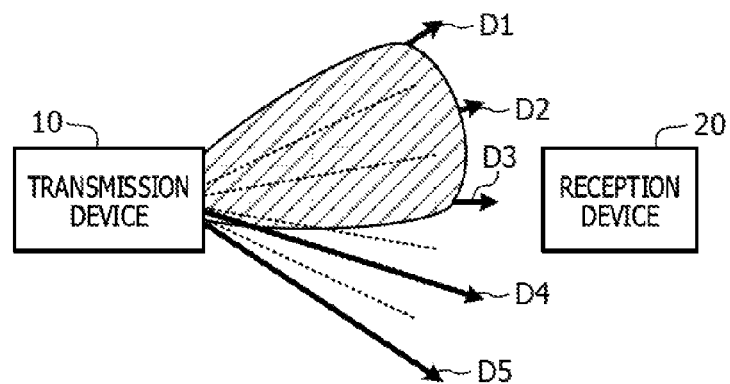
FIGS. 10A to 10C are explanatory diagrams each illustrating an example of a search signal transmitted by the transmission device in FIG. 1.
Figure 10B:
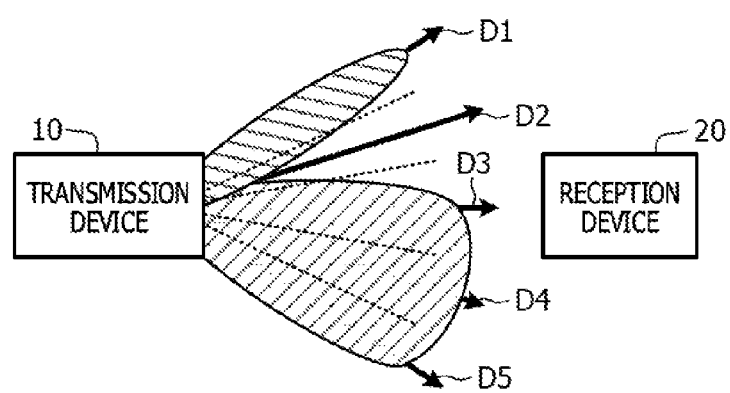
Figure 10C:
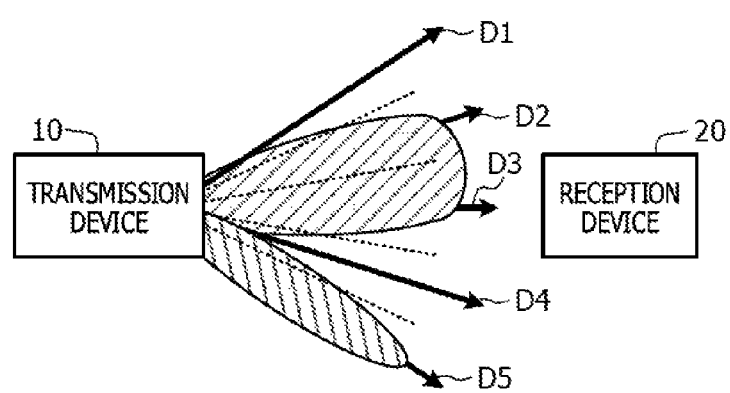

In addition, as illustrated in, for example, FIGS. 10A to 10C, radiation power levels in directions between directions adjacent to each other may be set to approximately the same levels as radiation power levels in the relevant directions. In other words, the wireless communication system 1 may use a beam width corresponding to the directions adjacent to each other.

First Example of Modification to First Embodiment

Next, a wireless communication system 1 of a first example of a modification to the first embodiment will be described. The wireless communication system 1 of the first example of a modification to the first embodiment is different to the wireless communication system of the first embodiment in that the reception device 20 selects a beam direction in the communication signal on behalf of the transmission device 10. Hereinafter, a difference will be mainly described.

Figure 12:
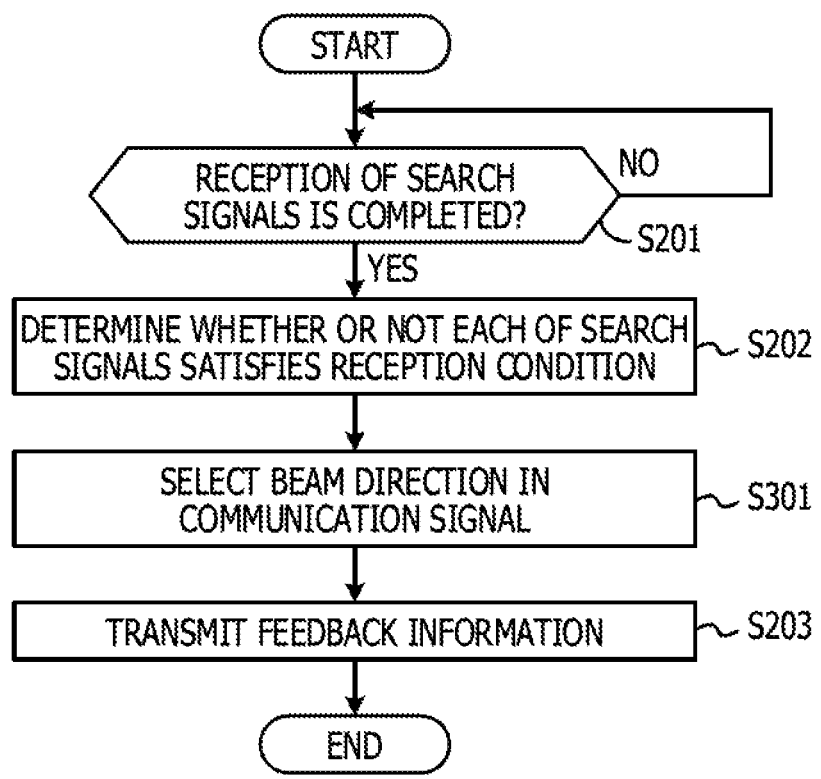
FIG. 12 is a flowchart illustrating an example of processing performed by a reception device of the first example of a modification to the first embodiment.

In the present example, in place of the processing illustrated in FIG. 6, the transmission device 10 performs processing illustrated in FIG. 11, and in place of the processing illustrated in FIG. 7, the reception device 20 performs processing illustrated in FIG. 12.

The processing illustrated in FIG. 11 is processing in which the processing operation in step S106 is removed from the processing illustrated in FIG. 6. The processing illustrated in FIG. 12 is processing in which a processing operation in step S301 is added to the processing illustrated in FIG. 7. The processing operation in step S301 is performed between the processing operation in step S202 and the processing operation in step S203.

Accordingly, after performing the processing operation in step S202, the reception device 20 selects a beam direction in the communication signal, based on a result of the determination in step S202 (step S301 in FIG. 12).

In addition, the reception device 20 generates the feedback information indicating the beam direction selected in step S301 and transmits the generated feedback information to the transmission device 10 (step S203 in FIG. 12).

This causes the transmission device 10 to receive the feedback information from the reception device 20. Accordingly, the transmission device 10 determines as "Yes" in step S105 in FIG. 11 and determines a communication weight for the communication signal, based on the beam direction indicated by the received feedback information (step S107 in FIG. 11). Next, by using the communication weight determined in step S107, the transmission device 10 transmits the communication signal (step S108 in FIG. 11). This causes the reception device 20 to receive the communication signal from the transmission device 10.

According to the wireless communication system 1 of the first example of a modification to the first embodiment, it is possible to achieve the same function and effect as those of the wireless communication system 1 of the first embodiment.

Furthermore, according to the wireless communication system 1 of the first example of a modification to the first embodiment, it is possible to suppress a load on the processing of the transmission device 10.

Second Embodiment

Next, a wireless communication system of a second embodiment will be described. The wireless communication system of the second embodiment is different to the wireless communication system of the first embodiment in that determination for reception of search signals is performed based on reception power levels in place of detection of an error. Hereinafter, a difference will be mainly described.

In the present example, a reception condition is a condition that a reception power level of one of the received search signals is larger than a threshold value. The reception power level is indicated by, for example, a received signal strength indicator (RSSI). In the present example, the threshold value is preliminarily set. Note that the reception power level may be expressed by a parameter (for example, RSRP) different from the RSSI. The RSRP is an abbreviation of reference signal received power.

According to the wireless communication system 1 of the second embodiment, it is possible to achieve the same function and effect as those of the wireless communication system 1 of the first embodiment.

In a case where the direction from the transmission device 10 to the reception device 20 is not included in directions that are not selected and that are included in the directions, reception power levels of received signals tend to decrease. Therefore, according to the wireless communication system 1 of the second embodiment, it is possible to improve a correlation between results of determination for the received signals and a direction that is nearest to the direction from the transmission device 10 to the reception device 20 and that is included in the directions. As a result, it is possible to select, from among the directions, a direction nearest to the direction from the transmission device 10 to the reception device 20 with a high degree of accuracy.

First Example of Modification to Second Embodiment

Next, a wireless communication system of a first example of a modification to the second embodiment will be described. The wireless communication system of the first example of a modification to the second embodiment is different to the wireless communication system of the second embodiment in that a threshold value used for a reception condition is determined based on reception power levels. Hereinafter, a difference will be mainly described.

In the present example, the threshold value used for the reception condition is set to a value obtained by subtracting a predetermined change amount from a maximum value out of reception power levels of the received search signals having the number J of search signals.

In the present example, the reception device 20 acquires a maximum value out of the reception power levels of the received search signals having the number J of search signals. Furthermore, the reception device 20 sets, as the threshold value used for the reception condition, a value obtained by subtracting the above-mentioned change amount from the acquired maximum value.

In the present example, the change amount is set based on a difference between a radiation power level in a beam direction and a radiation power level in a non-beam direction. In the present example, a difference between a radiation power level in a beam direction and a radiation power level in a non-beam direction is a difference (in other words, a gain difference) between an antenna gain in the relevant beam direction and an antenna gain in the relevant non-beam direction. In the present example, the change amount is the gain difference.

Figure 13:
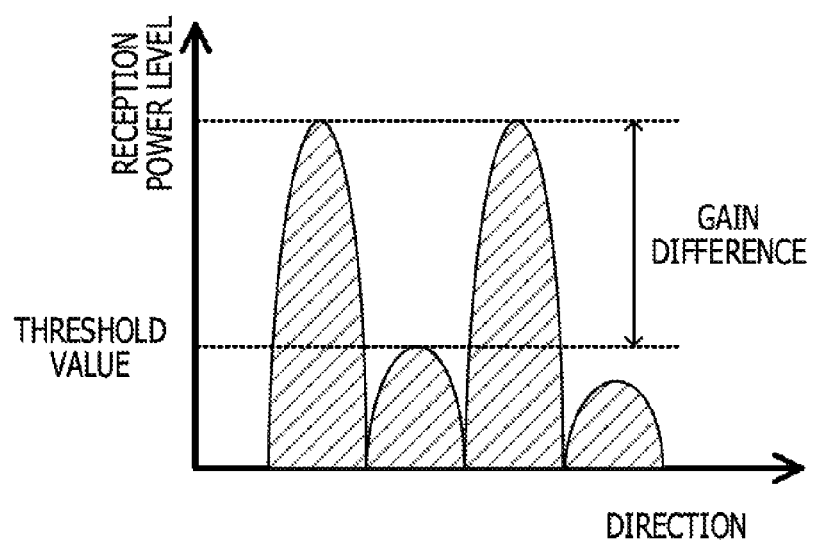
FIG. 13 is an explanatory diagram illustrating an example of a relationship between a reception power level, a gain difference, and a threshold value in a wireless communication system of a first example of a modification to a second embodiment.

In the present example, the search signals each include change amount information indicating the change amount. The reception device 20 uses, as the threshold value in the reception condition, a value obtained by subtracting the change amount, indicated by the change amount information included in the corresponding one of the search signals, from a maximum value out of reception power levels of the received search signals having the number J of search signals. FIG. 13 illustrates an example of a relationship between a reception power level, a gain difference, and a threshold value.

As illustrated in, for example, FIG. 14, a case where the reception power levels of the first to third search signals are −40 dBm, −45 dBm, and −60 dBm, respectively, and the change amount is 15 dB is assumed.

In this case, the maximum value out of the reception power levels is −40 dBm serving as the reception power level of the first search signal. Accordingly, the reception device 20 calculates, as the threshold value used for the reception condition, −55 dBm serving as a value obtained by subtracting 15 dB serving as the change amount from −40 dBm serving as the maximum value out of the reception power levels.

Furthermore, the reception device 20 determines whether or not the reception power level of each of the received search signals is larger than −55 dBm serving as the threshold value. In the present example, "○" in FIG. 14 indicates that the reception condition is satisfied. Furthermore, in the present example, "×" in FIG. 14 indicates that the reception condition is not satisfied.

According to the wireless communication system 1 of the first example of a modification to the second embodiment, it is possible to achieve the same function and effect as those of the wireless communication system 1 of the second embodiment.

By the way, depending on a distance between the transmission device 10 and the reception device 20, the reception power levels of the received signals vary. Therefore, if the same threshold value is used independently of a distance between the transmission device 10 and the reception device 20, the accuracy of determining whether or not the direction from the transmission device 10 to the reception device 20 is included in selected directions tends to decrease.

In addition, the maximum value out of the reception power levels corresponds to the reception power level of a signal in which a selected direction is nearest to the direction from the transmission device 10 to the reception device 20. Therefore, according to this wireless communication system 1, the threshold value may be set to an adequate value located between the reception power levels of signals in which selected directions include the direction from the transmission device 10 to the reception device 20 and the reception power levels of signals in which directions, not selected, include the direction from the transmission device 10 to the reception device 20. As a result, an adequate threshold value corresponding to a distance between the transmission device 10 and the reception device 20 may be used. Therefore, it is possible to determine, with a high degree of accuracy, whether or not the direction from the transmission device 10 to the reception device 20 is included in the selected directions.

In order to confirm an advantage based on the above-mentioned wireless communication system 1, the operation of the wireless communication system 1 is simulated by using numerical calculation. In this numerical calculation, the following assumptions are reflected. 1) The RSSI is calculated in view of a path loss. 2) A receiving sensitivity is −85 dB. 3) A block error rate in a case where a reception power level is greater than or equal to the receiving sensitivity is 1%. 4) The number I of directions is "15". 5) An angle formed by 2 directions adjacent to each other is the same. 6) A reception device is randomly located. 7) The number of trials is a hundred thousand. 8) The gain difference is 10 dB.

In the above-mentioned first wireless communication system, the number of signals transmitted in the beam search process is 15, and a search success rate is 100.0%. The search success rate is a ratio, to the total number of reception devices, of the number of reception devices in each of which a direction nearest to a direction from a transmission device to the relevant reception device is selected, based on the beam search process, from among 15 different directions.

In the wireless communication system 1 of the second embodiment, the number of signals transmitted in the beam search process is 4, and a search success rate is 81.8%.

In the wireless communication system 1 of the first example of a modification to the second embodiment, the number of signals transmitted in the beam search process is 4, and a search success rate is 96.1%.

In this way, according to each of the wireless communication system 1 of the second embodiment and the wireless communication system 1 of the first example of a modification to the second embodiment, it is possible to reduce the number of signals transmitted in the beam search process while suppressing a decrease in the search success rate.

Second Example of Modification to Second Embodiment

Next, a wireless communication system of a second example of a modification to the second embodiment will be described. The wireless communication system of the second example of a modification to the second embodiment is different to the wireless communication system of the second embodiment in that a threshold value used for a reception condition is determined based on reception power levels. Hereinafter, a difference will be mainly described.

In the present example, the threshold value used for the reception condition is set based on reception power levels of the received search signals having the number J of search signals and a first change amount and a second change amount set for each of the search signals.

In the present example, the reception device 20 acquires a maximum value out of values obtained by subtracting, from reception power levels of the received search signals having the number J of search signals, the respective first change amounts in which the number thereof is the number J of search signals. Furthermore, the reception device 20 sets, as the threshold value used for the reception condition for each of the search signals, a value obtained by adding, to the acquired maximum value, the second change amount set for the relevant search signal.

In the present example, the first change amounts are set based on radiation power levels in beam directions. In the present example, the radiation power levels in beam directions are antenna gains (in other words, beam direction gains) in the beam directions. In the present example, the first change amounts are the beam direction gains. The radiation power levels may be each considered as energy of an electromagnetic wave. The antenna gains in the beam directions may each indicate a ratio of a radiation power level in a beam direction to a radiation power level in a case where the electromagnetic wave is evenly radiated in all directions, for example.

In the present example, the second change amount is set based on a radiation power level in a non-beam direction. In the present example, a radiation power level in a non-beam direction is an antenna gain in the relevant non-beam direction (in other words, a non-beam direction gain). In the present example, the second change amount is the non-beam direction gain. The antenna gain in the non-beam direction may indicate a ratio of a radiation power level in a non-beam direction to a radiation power level in a case where the electromagnetic wave is evenly radiated in all directions, for example.

In the present example, the search signals each include first change amount information indicating the first change amount and second change amount information indicating the second change amount. The reception device 20 acquires a maximum value out of values obtained by subtracting, from reception power levels of the received search signals having the number J of search signals, the respective first change amounts indicated by the pieces of first change amount information included in the respective search signals having the number J of search signals. A value obtained by subtracting, from a reception power level of a search signal, the corresponding first change amount indicated by the first change amount information included in the relevant search signal may be expressed as a virtual reception power level. Furthermore, the reception device 20 sets, as the threshold value used for the reception condition for each of the search signals, a value obtained by adding, to the acquired maximum value, the second change amount indicated by the second change amount information included in the relevant search signal.

Figure 15A:
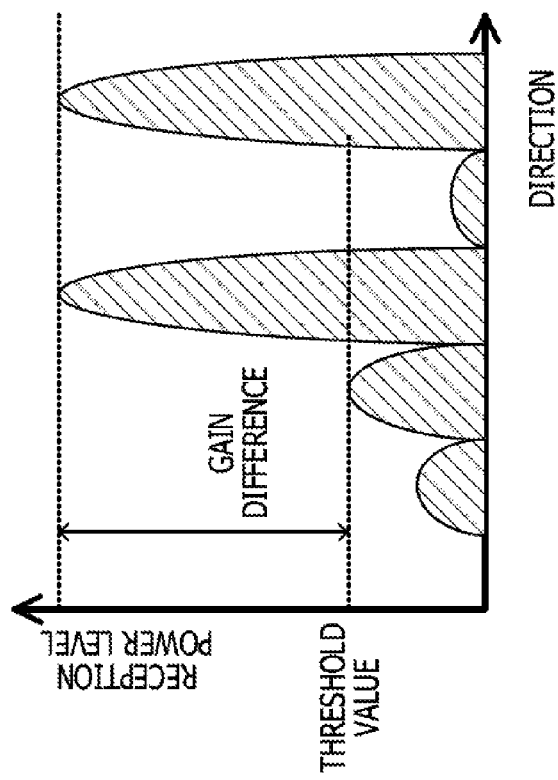
FIGS. 15A and 15B are explanatory diagrams each illustrating an example of a relationship between a reception power level, a gain difference, and a threshold value in a wireless communication system of a second example of a modification to the second embodiment.
Figure 15B:
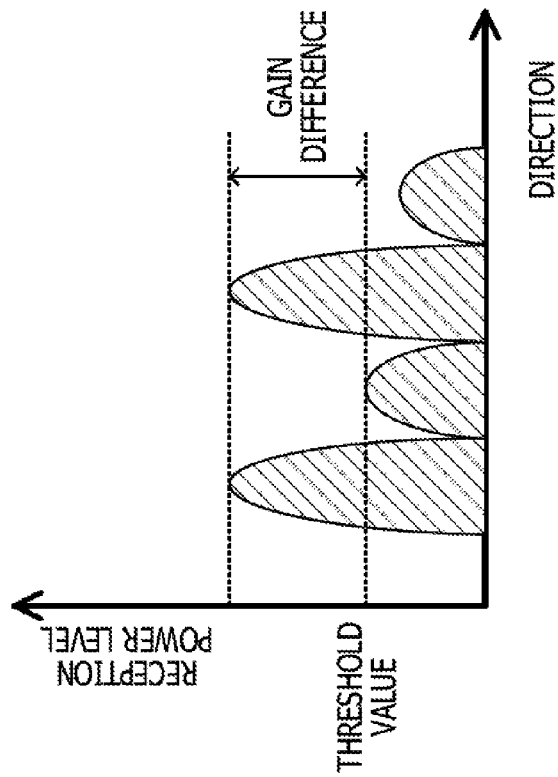

FIG. 15A illustrates an example of a relationship between a reception power level, a gain difference, and a threshold value for the first search signal. FIG. 15B illustrates an example of a relationship between a reception power level, a gain difference, and a threshold value for the third search signal.

As illustrated in, for example, FIG. 16, a case where the beam direction gains of the first to third search signals are 15 dBi, 7 dBi, and 20 dBi, respectively, is assumed. Furthermore, a case where the non-beam direction gains of the first to third search signals are 8 dBi, 2 dBi, and 4 dBi, respectively, is assumed. In addition, a case where the reception power levels of the first to third search signals are −40 dBm, −45 dBm, and −60 dBm, respectively, is assumed.

In this case, a maximum value out of virtual reception power levels for the first to third search signals is −52 dBm serving as the virtual reception power level of the second search signal. Accordingly, as the threshold value used for the reception condition for the first search signal, the reception device 20 calculates −44 dBm serving as a value obtained by adding, to −52 dBm serving as the maximum value out of the virtual reception power levels, 8 dBi serving as the second change amount indicated by the second change amount information included in the first search signal. In the same way, the reception device 20 calculates, as the threshold values used for the reception conditions for the second and third search signals, −50 dBm and −48 dBm, respectively.

Furthermore, the reception device 20 determines whether or not the reception power level of each of the received search signals is larger than the threshold value for the relevant search signal. In the present example, "◯" in FIG. 16 indicates that the reception condition is satisfied. Furthermore, in the present example, "×" in FIG. 16 indicates that the reception condition is not satisfied.

According to the wireless communication system 1 of the second example of a modification to the second embodiment, it is possible to achieve the same function and effect as those of the wireless communication system 1 of the second embodiment.

By the way, a radiation power level in any one of selected directions varies between signals (the search signals in the present example). In the same way, a radiation power level in any one of directions not selected varies between signals.

Therefore, if a common threshold value between signals is used, the accuracy of determining whether or not the direction from the transmission device 10 to the reception device 20 is included in selected directions tends to decrease.

In addition, a reception power level serving as a basis of a maximum value out of values obtained by subtracting, from the reception power levels of signals, respective values based on radiation power levels in selected directions corresponds to the reception power level of a signal in which the corresponding one of the selected directions is nearest to the direction from the transmission device 10 to the reception device 20.

In addition, values obtained by adding, to the above-mentioned maximum value, values based on radiation power levels in directions not selected correspond to the reception power levels of signals in which the directions not selected include the direction from the transmission device 10 to the reception device 20.

Therefore, according to this wireless communication system 1, for each of signals, the threshold value may be set to an adequate value located between the reception power levels of the signals in which selected directions include the direction from the transmission device 10 to the reception device 20 and the reception power levels of the signals in which directions, not selected, include the direction from the transmission device 10 to the reception device 20. As a result, an adequate threshold value corresponding to each of the signals may be used. Therefore, it is possible to determine, with a high degree of accuracy, whether or not the direction from the transmission device 10 to the reception device 20 is included in the selected directions.

Note that the search signals may each include information indicating a difference between the first change amount and the second change amount, in place of the first change amount information and the second change amount information. The difference between the first change amount and the second change amount is, for example, a gain difference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system comprising:
a transmission device including:
a first memory; and
a first processor coupled to the first memory and the first processor configured to:
perform a plurality of transmitting processes in accordance with a plurality of transmitting patterns, each of the plurality of transmitting processes including transmitting a plurality of signals for a plurality of directions in parallel by forming a plurality of beams corresponding to the plurality of directions, each of the plurality of transmitting patterns being defined a combination of directions to be transmitted in parallel; and
a reception device including:
a second memory; and
a second processor coupled to the second memory and the second processor configured to:
perform a plurality of receiving processes, each of the plurality of receiving processes including receiving at least one signal transmitted from the transmission device; and
determine whether or not, for each of the plurality of receiving processes, the at least one signal satisfies a predetermined condition, the condition is a condition that a reception power level of the at least one received signal is greater than a threshold value and the threshold value is a value obtained by subtracting a specified value amount from a maximum value of reception power levels among the plurality of receiving processes; wherein
the first processor is further configured to:
receive a result of the determining from the reception device; and
select a transmitting direction for the reception device from the plurality of directions based on the result of the determining.

2. The wireless communication system according to claim 1, wherein
the further includes a condition that no error is detected by an error detection code included in the at least one received signal.

3. The wireless communication system according to claim 1, wherein
the specified value is set based on a difference between a radiation power level in one of selected directions and a radiation power level in one of directions that are different from the selected directions and that are included in the directions.

4. A wireless communication system comprising:
a transmission device including:
a first memory; and
a first processor coupled to the first memory and the first processor configured to:
perform a plurality of transmitting processes in accordance with a plurality of transmitting patterns, each of the plurality of transmitting processes including transmitting a plurality of signals for a plurality of directions in parallel by forming a plurality of beams corresponding to the plurality of directions, each of the plurality of transmitting patterns being defined a combination of directions to be transmitted in parallel; and
a reception device including:
a second memory; and
a second processor coupled to the second memory and the second processor configured to:
perform a plurality of receiving processes, each of the plurality of receiving processes including receiving at least one signal transmitted from the transmission device; and
determine whether or not, for each of the plurality of receiving processes, the at least one signal satisfies a predetermined condition; wherein
the first processor is further configured to:
receive a result of the determining from the reception device; and
select a transmitting direction for the reception device from the plurality of directions based on the result of the determining, wherein
the condition is a condition that a reception power level of the at least one received signal is greater than a threshold value, and
the threshold value is a value obtained by adding a second value that is set for the at least one received signal serving as a target of the determination utilizing the threshold value to a maximum value out of values obtained by subtracting, from the reception power levels of each of the plurality of receiving processes, first values set for each of the plurality of receiving processes.

5. The wireless communication system according to claim 4, wherein
the first values are set based on radiation power levels of each of the plurality of directions defined in each of the plurality of transmitting patterns; and wherein
the second value is set based on a radiation power level in a specified direction that are different from the plurality of directions.

6. A transmission device comprising:
a memory; and
a processor coupled to the first memory and the processor configured to:
perform a plurality of transmitting processes in accordance with a plurality of transmitting patterns, each of the plurality of transmitting processes including transmitting a plurality of signals for a plurality of directions in parallel by forming a plurality of beams corresponding to the plurality of directions, each of the plurality of transmitting patterns being defined a combination of directions to be transmitted in parallel;
receive a result of a determining from a reception device, the determining including determining whether or not, for each of a plurality of receiving processes, the at least one signal satisfies a predetermined condition, each of the plurality of receiving processes including receiving at least one signal transmitted from the transmission device, the condition is a condition that a reception power level of the at least one received signal is greater than a threshold value and the threshold value is a value obtained by subtracting a specified value amount from a maximum value of reception power levels among the plurality of receiving processes; and
select a transmitting direction for the reception device from the plurality of directions based on the result of the determining.

7. A transmission method executed by a transmission device, the transmission method comprising:
performing a plurality of transmitting processes in accordance with a plurality of transmitting patterns, each of the plurality of transmitting processes including transmitting a plurality of signals for a plurality of directions in parallel by forming a plurality of beams corresponding to the plurality of directions, each of the plurality of transmitting patterns being defined a combination of directions to be transmitted in parallel;
receiving a result of a determining from a reception device, the determining including determining whether or not, for each of a plurality of receiving processes, the at least one signal satisfies a predetermined condition, each of the plurality of receiving processes including receiving at least one signal transmitted from the transmission device, the condition is a condition that a reception power level of the at least one received signal is greater than a threshold value and the threshold value is a value obtained by subtracting a specified value amount from a maximum value of reception power levels among the plurality of receiving processes; and
selecting a transmitting direction for the reception device from the plurality of directions based on the result of the determining.

\* \* \* \* \*